Patented Jan. 17, 1950

2,495,105

UNITED STATES PATENT OFFICE 2,495,105

PRODUCTION OF DERIVATIVES OF OLEO-NITRILE HAVING SURFACE ACTIVE PROPERTIES

William Kaplan, Brooklyn, N. Y., assignor to Sun Chemical Corporation, New York, N. Y., a corporation of Delaware No Drawing. Application February 12, 1946, Serial No. 647,217

3 Claims. (Cl. 260—458)

The present invention relates to surface active materials, and it particularly relates to materials for detergent, finishing, softening, wetting and re-wetting agents.

Although not limited thereto, the present invention will be particularly described in connection with surface active materials useful in the textile industries.

It is among the objects of the present invention to prepare improved surface active agents, which may be readily prepared and which will be relatively inexpensive and which further will be equally effective under acid and alkaline conditions.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has been found that higher molecular weight aliphatic nitriles when sulfonated or sulfated, or, less preferably when phosphated or borated, form excellent surface active materials.

The sulfonated and sulfated nitriles are much superior to the sulfonated or sulfated esters of the same fatty acids in being resistant to hydrolysis both in manufacture and use and in their surface active properties.

Sulfonated or sulfated nitriles are also superior to the sulfonated or sulfated esters in that much smaller quantities of sulfuric acid are necessary to effect the desired degree of sulfonation.

The sulfonated or sulfated esters are much less effective wetting agents at pH's above 7. The surface activity of the sulfonated or sulfated nitriles is just as great under alkaline conditions as under acid conditions.

In carrying out the preferred procedure, 100 parts by weight of a nitrile of an unsaturated fatty acid, or a mixture of fatty acids, preferably consisting of or containing oleic acid or elaidic acid, having from 10 to 36 carbon atoms, and desirably only having one unsaturated bond, is treated with 20 to 60 parts by weight of concentrated sulfuric acid of at least 75% strength at a temperature not exceeding 40° C. and desirably below 20° C. After about one-half to several hours, the reaction will be completed and a caustic soda solution is added to neutralize the acid.

Upon heating the neutralized reaction mixture, there will be a separation of a concentrated aqueous solution of the sodium salt of the sulfonated nitrile.

As a specific example:

38 cc. of 100% $H_2SO_4$ were added slowly to 116 grams of oleonitrile while keeping the temperature below 15° C. Stirring was continued for one hour. About 200 grams of ice were added to the reaction mass and sufficient 25% sodium hydroxide solution to bring the pH to 6. The mass was then heated on a hot water bath to form two layers and the lower layer was discarded. The upper layer consisted of a solution of the sodium salt of the sulfonated oleonitrile in water, containing about 50% water by weight of the sodium salt.

Instead of the sodium salt of the sulfonated nitrile, other alkali metal salts, or ammonium salts or water soluble aliphatic amine salts of the sulfonated nitriles may be employed. Among the amines which may be used are mono-, di- and tri-ethanolamine, morpholine and diethylene triamine.

The higher fatty acid nitriles may be sulfonated by themselves or in mixtures with other materials capable of sulfonation, such as free oleic acid, oleic acid esters or castor oil. The sulfonation may be conducted in the presence of alcohols, such as ethyl alcohol or butyl alcohol, or in the presence of ethers such as ethyl ether, dioxane or low molecular weight aliphatic acids, such as acetic acid.

Instead of sulfuric acid, fuming sulfuric acid, sulfur trioxide, chlorosulphonic acid and other sulfonating agents may be used.

As many changes could be made in the above surface active materials and methods of making the same, and many widely varying embodiments of this invention could be made without departing from the scope of the claims, it is intended that all matter contained in the above description shall be interpreted as illustrative and not in a limiting sense.

What is claimed is:

1. A process of making sulfonated oleonitrile, which comprises reacting oleonitrile with concentrated sulfuric acid at a temperature below 40° C. for ½ to 2 hours, adding sufficient aqueous caustic alkali with cooling to neutralize the acid to slightly acid pH, allowing the reaction mixture to stand, to separate into two layers, and removing the upper layer consisting of a solution of the sodium salt of sulfonated oleonitrile in water.

2. A process of making a surface active material which comprises reacting approximately 116 parts of oleonitrile with approximately 70 parts of sulphuric acid of 100 per cent concentration at a temperature below 15° C.

3. A process of making surface active material, which comprises reacting oleonitrile with sulfuric acid of at least 75% concentration at a temperature below 40° C. in the presence of an oxygen-containing aliphatic solvent.

WILLIAM KAPLAN.

REFERENCES CITED

The following references are of record in the file of this patent:

UNITED STATES PATENTS

| Number | Name | Date |
|---|---|---|
| 1,931,491 | Haussmann | Oct. 24, 1933 |
| 2,037,974 | Guenther et al. | Apr. 21, 1936 |
| 2,177,619 | Nicodemus et al. | Oct. 24, 1939 |
| 2,229,649 | Guenther et al. | Jan. 28, 1941 |
| 2,312,878 | Carpenter | Mar. 2, 1943 |
| 2,316,847 | Dreyfus | Apr. 20, 1943 |

OTHER REFERENCES

Ssabanejew: Beilstein (4th. ed., 1920), vol. II, p. 465.

Chuit et al.: Helv. Chem. Acta, vol. 10, pp. 113–117 (1927).